United States Patent
Maier et al.

(10) Patent No.: US 8,855,898 B2
(45) Date of Patent: Oct. 7, 2014

(54) SYSTEMS AND METHODS TO DIAGNOSE VALVE LEAKAGE IN A VEHICLE

(75) Inventors: Oliver Maier, Worms (DE); Michael Leykauf, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 225 days.

(21) Appl. No.: 13/097,610

(22) Filed: Apr. 29, 2011

(65) Prior Publication Data

US 2012/0277984 A1    Nov. 1, 2012

(51) Int. Cl.

| | |
|---|---|
| *F02D 28/00* | (2006.01) |
| *G06F 19/00* | (2011.01) |
| *F02M 21/02* | (2006.01) |
| *B60K 15/03* | (2006.01) |
| *B60K 15/07* | (2006.01) |
| *B60K 1/00* | (2006.01) |

(52) U.S. Cl.
CPC .. *F02M 21/0242* (2013.01); *B60K 2015/03026* (2013.01); *B60K 15/07* (2013.01); *B60K 15/03006* (2013.01); *B60K 2001/001* (2013.01); *Y02T 10/32* (2013.01); *B60K 2015/03315* (2013.01); *B60K 2015/03013* (2013.01)
USPC ........................................................ 701/115

(58) Field of Classification Search
USPC ........... 73/114.42, 114.43; 123/527, DIG. 12; 251/129.04; 701/103, 104; 702/182, 702/183, 185
See application file for complete search history.

(56) References Cited

U.S. PATENT DOCUMENTS

| | | | |
|---|---|---|---|
| 4,144,743 A | 3/1979 | Covington et al. | |
| 4,198,855 A | 4/1980 | Tsujikura | |
| 5,050,080 A * | 9/1991 | Abe | 701/29.2 |
| 5,611,316 A * | 3/1997 | Oshima et al. | 123/494 |
| 6,167,749 B1 | 1/2001 | Yanagisawa et al. | |
| 6,390,075 B1 * | 5/2002 | Yamazaki et al. | 123/529 |
| 2004/0099048 A1 | 5/2004 | Miura et al. | |
| 2007/0202367 A1 * | 8/2007 | Yoshida | 429/13 |

FOREIGN PATENT DOCUMENTS

| | | |
|---|---|---|
| DE | 10353330 A1 | 2/2008 |
| WO | 2009151387 A1 | 12/2009 |

* cited by examiner

*Primary Examiner* — Thomas Moulis
*Assistant Examiner* — Elizabeth Hadley
(74) *Attorney, Agent, or Firm* — Dinsmore & Shohl LLP (57) ABSTRACT

Systems and methods to diagnose valve leakage in a vehicle storing gaseous fuel in two or more vessels. A valve regulating the flow of the gaseous fuel from one of the vessels is closed and reopened, while the other vessels are providing gaseous fuel during a full run. The pressure spike from reopening the valve is analyzed to determine the rate of pressure change. Pressure spikes having a rate of change lower than a threshold parameter are indicative of a leaking valve.

19 Claims, 6 Drawing Sheets

SYSTEMS AND METHODS TO DIAGNOSE VALVE LEAKAGE IN A VEHICLE

BACKGROUND OF THE INVENTION

The present invention relates generally to detecting valve leakage in a vehicle, and more particularly to systems and methods detecting valve leakage during a full run of a gaseous fuel system of a vehicle.

Automotive technology is rapidly expanding in the area of finding alternatives to using gasoline as the primary source of energy in vehicle propulsion systems. One area of interest in recent years has focused on utilizing gasses as fuel. Gasses such as hydrogen, provide a promising alternative to gasoline because of their abundance in nature. Water, for example, can be chemically broken down to produce both hydrogen and oxygen gasses. Propulsion for a vehicle may be achieved in one of two ways. In one case, the gas may be used as part of a chemical reaction within a cell to produce electrical energy to propel the vehicle. In another case, the gas is combusted by an engine to convert its chemical energy directly into mechanical energy. Such systems typically produce less pollution than petroleum-based vehicles, since the product of hydrogen combustion is water vapor, instead of carbon-based greenhouse gasses.

The transport of hydrogen and other gasses within a vehicle fuel cell presents new challenges to the automotive industry. The gasses are typically transported and used within pressurized gas systems. Any leakage of gas in such systems, therefore, presents a safety hazard to both the passengers of the vehicle, as well as to those nearby. Therefore, recent efforts have been made in the automotive field to improve the safety of pressurized vehicle systems by detecting hazardous conditions, such as gas leakage.

SUMMARY OF THE PRESENT INVENTION

In one embodiment, a method for detecting a valve fault condition in a vehicle gaseous fuel system is disclosed. The gaseous fuel system includes a plurality of connected vessels having tank valves regulating the flow of gaseous fuel therefrom. The method includes utilizing a processor to send a valve close command to a tank valve at a first time, when the remaining tank valves are open, and to send a valve open command to the tank valve at a second time. The method further includes receiving, at the processor, pressure data measured from the gaseous fuel system and using the pressure data to determine the rate of change in the pressure of the gaseous fuel system as a function of time. The method additionally includes determining if a valve fault condition exists by comparing the rate of change from when the valve open command was sent to a threshold parameter.

In another embodiment, a controller for a vehicle storing gaseous fuel in a gaseous fuel system is disclosed. The fuel system includes a plurality of connected vessels having tank valves regulating the flow of gaseous fuel therefrom. The controller includes one or more processors and a non-transitory memory coupled to the one or more processors and storing instructions that, when executed by the processor, cause the one or more processors to send a valve close command to a tank valve at a first time and a valve open command to the tank valve at a second time, when the remaining tank valves in the plurality are open. The instructions also cause the one or more processors to receive pressure data from a pressure sensor that measures the pressure of the fuel system and to use the pressure data to determine the rate of change in the pressure of the fuel system as a function of time. The instructions further cause the one or more processors to determine if a valve fault condition exists by comparing the rate of change from when the valve open command was sent to a threshold parameter stored in the memory.

In another embodiment, a gaseous fuel system for a vehicle is disclosed. The fuel system includes two or more vessels that store gaseous fuel, at least one valve coupled to each vessel that regulates the flow of the gaseous fuel from each vessel and a common fuel line that connects the valves. The fuel system also includes a pressure sensor that measures the pressure in the common fuel line. The fuel system further includes a controller that closes the at least one valve of a vessel while the valves of the other vessels are open, reopens the at least one valve, receives pressure measurements from the pressure sensor, determines the rate of change of the pressure over time from when the valve is reopened, and determine if a valve fault condition exists for the at least one valve by comparing the rate of change to a threshold parameter.

BRIEF DESCRIPTION OF THE DRAWINGS

The following detailed description of specific embodiments can be best understood when read in conjunction with the following drawings, where like structure is indicated with like reference numerals and in which.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION OF THE PREFERRED EMBODIMENTS

As stated above, recent efforts have been made to improve the overall safety of vehicles propelled using pressurized gas systems. However, previous diagnostic systems have typically only been able to detect hazardous conditions at system shutdown. Such diagnostic systems are limited, since leakage detection is only performed at these times. In addition, such diagnostic systems also require the consumption of gaseous fuel as part of the diagnostic routine, in order to test the pressurized system. A diagnostic system that performs at full-run, according to an aspect of the present invention, allows for increased vehicle safety and efficiency over previous systems.

Figure 1:
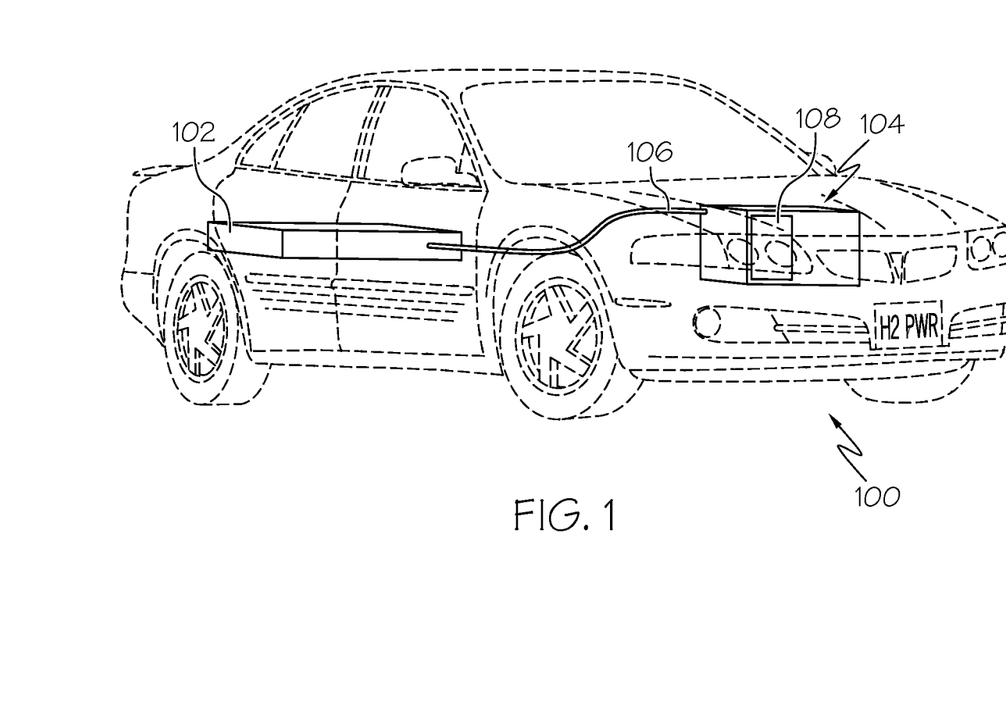
FIG. 1 is a schematic illustration of a vehicle having a gaseous fuel system, according to an aspect of the present invention.

Referring now to FIG. 1, vehicle 100 is shown, according to an exemplary embodiment. Vehicle 100 stores fuel as pressurized gas and/or a liquid in fuel storage 102. The gaseous fuel may be, for example, hydrogen, methane, propane, or any other combustible gas capable of providing energy to propel vehicle 100. Fuel storage 102 may have one or more storage tanks that are connected to engine 104 via pressurized line 106. In one embodiment, engine 104 may ignite the gas provided by fuel storage 102 to convert the chemical energy stored in the gas into mechanical energy to propel the vehicle. In another embodiment, engine 104 may be an electric or hybrid-electric engine. In this case, the gas provided by fuel storage 102 may be used as part of a chemical reaction to produce electricity, which is used to power engine 104. In either case, the storage and use of the gaseous fuel in vehicle 100 requires oversight to ensure safety.

Vehicle 100 also includes controller 108, which may include any number of hardware and software components to oversee the pressurized gas system of vehicle 100. For example, controller 108 may be one or more microprocessors, application-specific integrated circuits (ASICs), or field-programmable gate arrays (FPGAs). Controller 108 may also include machine instructions stored within a memory device which are capable of implementing one or more monitoring or control functions when executed by a processor of controller 108. For example, controller 108 may also include one or more non-transitory memory devices such as ROM, EEPROM, flash memory, or the like, as well as any other computer-readable medium capable of storing the machine instructions for controller 108.

Figure 2:
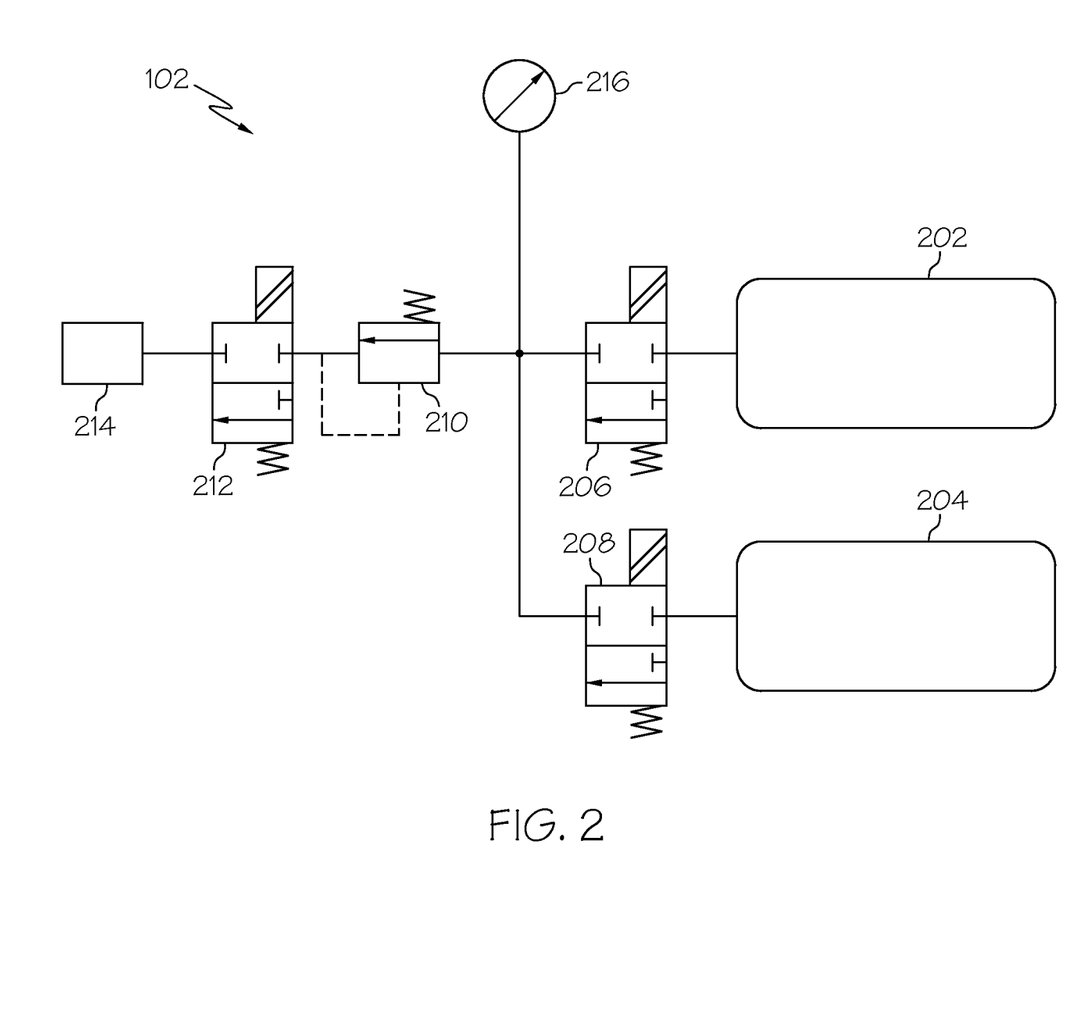
FIG. 2 is a detailed schematic illustration of a gaseous fuel storage system, according to an aspect of the present invention.

Referring now to FIG. 2, a detailed schematic illustration of fuel storage 102 is shown, according to an exemplary embodiment. Fuel storage 102 includes vessels 202, 204. Vessels 202, 204 store the gaseous fuel under pressure for use by vehicle 100. Although two vessels are shown, it is understood that this exemplary only and that fuel storage 102 may include any number of connected vessels.

Vessels 202, 204 are connected to tank valves 206, 208, respectively. Tank valves 206, 208 regulate the flow of gaseous fuel out of vessels 202, 204 into the gas distribution system of fuel storage 102. Similarly, a master valve 212 may regulate the flow of gaseous fuel from fuel storage 102 to other systems of vehicle 100. Any suitable type of valve may be used for tank valves 206, 208, and master valve 212 (e.g., solenoid valves, pneumatic valves, etc.). Tank valves 206, 208, and/or master valve 212 may also be electronically controlled to open or close, either in response to directly receiving a voltage command or by indirectly receiving a voltage command (e.g., a pump regulating a pneumatic valve receives the voltage command and operates the valve, or any other device receives the voltage command and causes the valve to open or close). In some embodiments, tank valves 206, 208, and/or master valve 212 may be controlled using an active-low command (e.g., a valve opens when no voltage command is received or if the voltage command is below a certain range). In other embodiments, tank valves 206, 208, and/or master valve 212 may be controlled using an active-high command (e.g., a valve opens when a received voltage command is above a certain range). In general, valves controlled by active-high commands are typically used in vehicle fuel systems, since their default behavior when not receiving a command is to remain closed.

In one embodiment, if master valve 212 and valves 206, 208 are open, fuel storage 102 may provide gaseous fuel to anode injectors 214, which are connected to a fuel cell stack that converts the chemical energy of the fuel into electricity to propel vehicle 100. In another embodiment, anode injectors 214 are omitted and the gaseous fuel from fuel storage 102 is provided directly to engine 104 and combusted to convert the chemical energy of the fuel into mechanical energy to propel vehicle 100. Fuel storage 102 also includes pressure sensor 216, which measures the pressure within the gas distribution system of fuel storage 102. Pressure regulators 210 regulate the pressure of vessels 202, 204, when open. In some embodiments, pressure regulators 210 may include regulators that may be controlled mechanically (e.g., a regulator activates if a certain pressure threshold is met), and/or regulators that are controlled electronically (e.g., a regulator activates in response to receiving an electronic command).

A number of potential valve failure conditions may exist in tank valve 206, tank valve 208, and/or in master valve 212 and lead to hazardous conditions in vehicle 100. First, a valve can become stuck due to friction. Second, a valve can develop leaks due to sealing abrasions in the valve. Third, particles may become lodged in the valve over time and cause leakage. In any of these cases, strict control over the gaseous fuel within fuel storage 102 is no longer possible. Therefore, detection of valve failure conditions provides an important safety feature for any vehicle storing gaseous fuel.

In prior systems, valve failure conditions are detected as part of a shutdown operation. For example, pressure measurements from pressure sensor 216 taken during shutdown can be used to detect valve failures. As valves 206 and 208 are shut, a defined amount of gaseous fuel is consumed. The pressure decrease is estimated in relation to the required mass flow of the gaseous fuel. If the pressure decrease is lower than estimated, this may indicate a valve failure. However, such systems are only able to detect valve failures at discrete times (e.g., only during shutdowns). In addition, these systems also require an amount of fuel to be consumed as part of the detection process, leading to a higher consumption of fuel by vehicle 100.

According to an aspect of the present invention, valve failure conditions may be detected during a full run of the fuel system, i.e., when gaseous fuel is used to provide power to the vehicle. In a multi-vessel system, such as in vehicle 100, the effects of opening one vessel during a full run on the system's pressure can be observed to detect valve failures in the valve. While one valve is closed and reopened, the resulting pressure surge is observed and used to evaluate whether the valve is operating normally.

Figure 3:
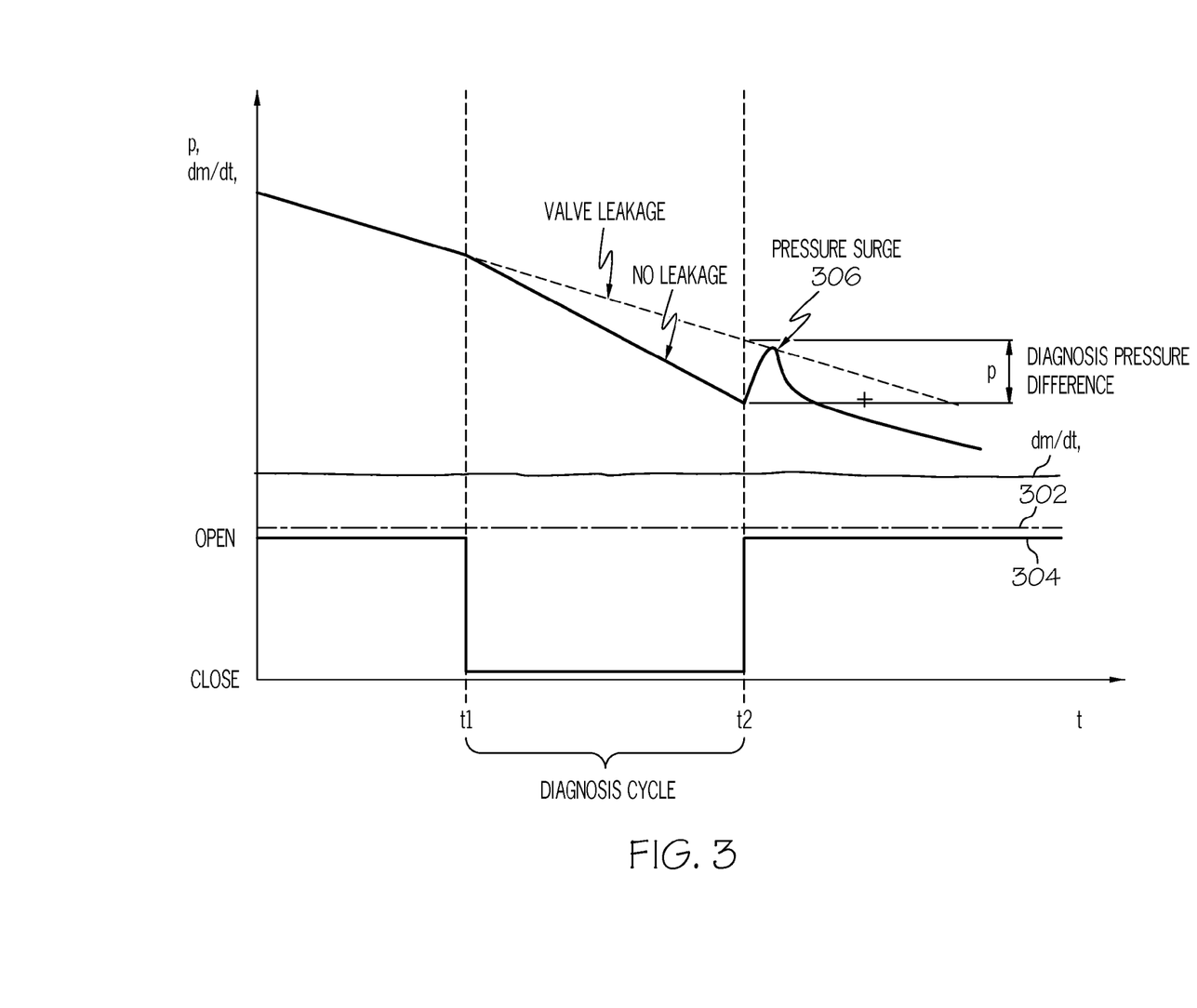
FIG. 3 is a plot of fuel system pressure as a function of time, as a tank valve is cycled, according to an aspect of the present invention.

Referring now to FIG. 3, a plot of system pressure as a function of time is shown, according to an exemplary embodiment. During a full-run of the system of vehicle 100, pressure sensor 216 measures the pressure in fuel storage 102 over the course of time, as valves 206 and 208 are operated. As part of the diagnostic routine, control signal 302 operates valve 206, while control signal 304 operates valve 208. In addition, the mass flow of the gaseous fuel is also shown as dm/dt. In general, it is not necessary to directly measure the mass flow in fuel cell systems that convert the fuel to electrical energy, as the mass flow value can be estimated using the stack current in the fuel cell.

Valve fault conditions can be detected for valve 208 by cycling valve 208 and holding valve 206 open during the test. At time t1, control signal 304 causes valve 208 to close, thereby also causing a decrease in the pressure measured by pressure sensor 216. At time t2, valve command 304 causes valve 208 to reopen. During times t1 and t2 (e.g., while valve 208 is closed), the amount of pressure drop in the system is related to the condition of valve 208. If valve 208 is operating normally, i.e., without leakage, the pressure of the entire system will decrease at a faster rate than if valve 208 is leaking.

When control signal 304 reopens valve 208 at time t2, a pressure surge 306 results that can be used to diagnose leakage in valve 208. If valve 208 is functioning normally, pressure surge 306 will spike quickly. However, if valve 208 is leaking, there will be less of a pressure difference between vessels 202 and 204, resulting in a smaller pressure surge 306, or no pressure surge at all. In some embodiments, the actual measured pressure may be compared against an expected pressure (e.g., the plot indicating no leakage), in order to detect leaks in valve 208. Alternatively, by comparing the derivative of pressure spike 306 to a threshold value, leaks in valve 208 can be detected. Utilizing the derivative of pressure spike 306 to detect leaks may be more accurate than a straight comparison between actual and expected pressures, since pressure measurements may include some degree of error due to sensor tolerances and other sources of error.

It should also be appreciated that the amount of time between times t1 and t2 needed to cause pressure surge 306 may be varied according to the design of the system. For example, the amount of time between times t1 and t2 may be varied based on the number of vessels in the system, the volumes of the vessels, and the flow of gaseous fuel within the system.

Figure 4A:
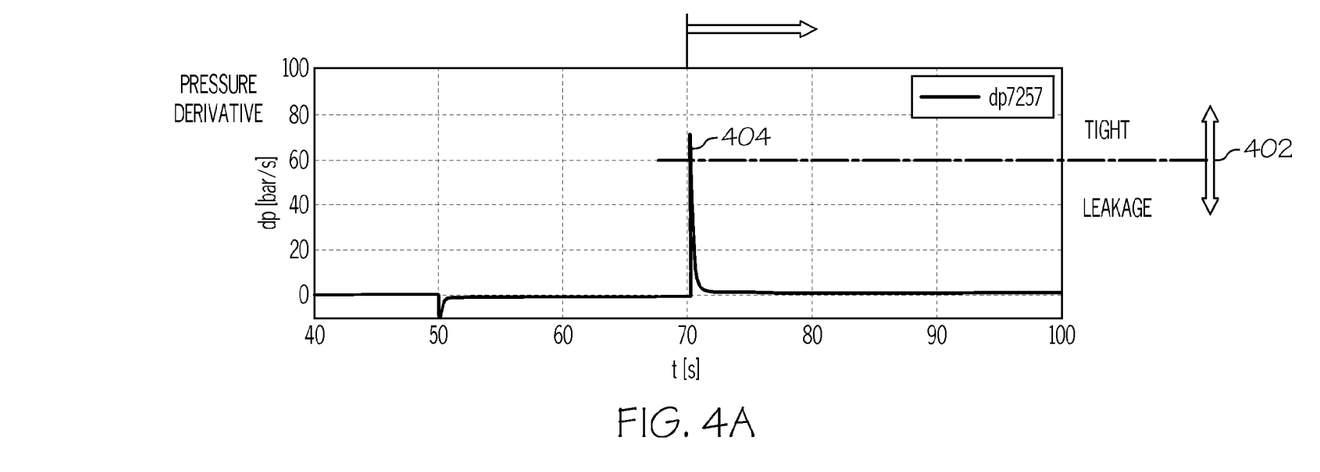
FIG. 4A is a plot of a pressure derivative as a function of time for a normally functioning tank valve, according to an aspect of the present invention.
Figure 4B:
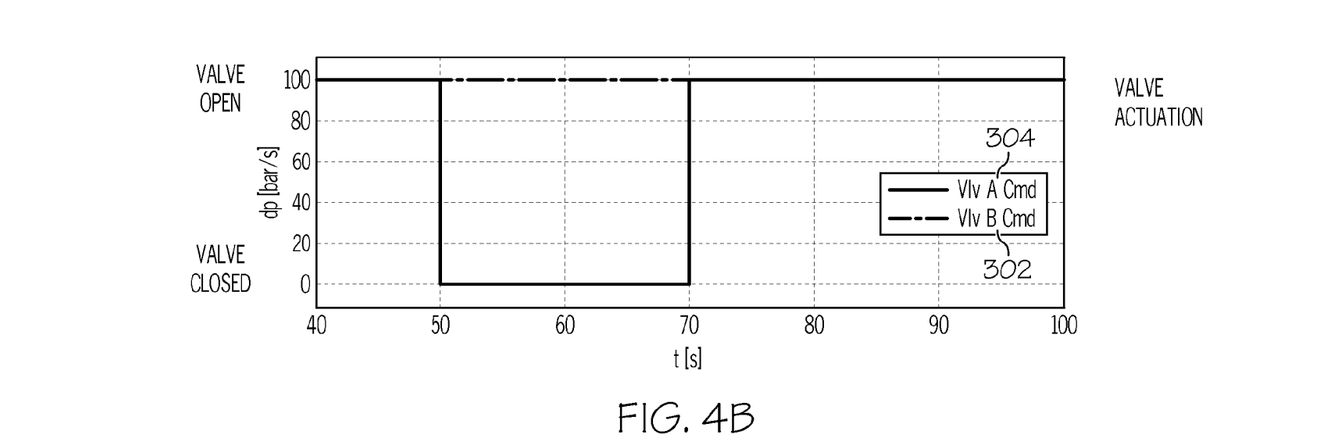
FIG. 4B is a plot of the position of tank valves as a function of time.

Referring now to FIG. 4A, a plot of the pressure derivative for a normally functioning valve 208 is shown, according to an exemplary embodiment. As shown, valve 208 is tight, i.e., it has no leakage. FIG. 4B shows when control signal 302 forces valve 208 to reopen. FIGS. 4A and 4B, read in conjunction, show the rapid change in the pressure when the valve 208 reopens, evidenced by the pressure spike, which also causes the pressure derivative to sharply increase. Therefore, the amount of increase in the pressure derivative is indicative of how well valve 208 is functioning.

The pressure derivative at the time that valve 208 is reopened may be compared against a threshold value 402 to determine if valve 208 is leaking. Since leakage in valve 208 causes its pressure derivative to be lower when valve 208 is reopened, a pressure differential below threshold value 402 may be indicative of leakage. In some embodiments, threshold value 402 may be predetermined by the manufacturer of vehicle 100, set during a time in which the gaseous fuel system of vehicle 100 is operating normally, or in any other way to determine an acceptable range for the pressure derivative when valve 208 is reopened.

Figure 5A:
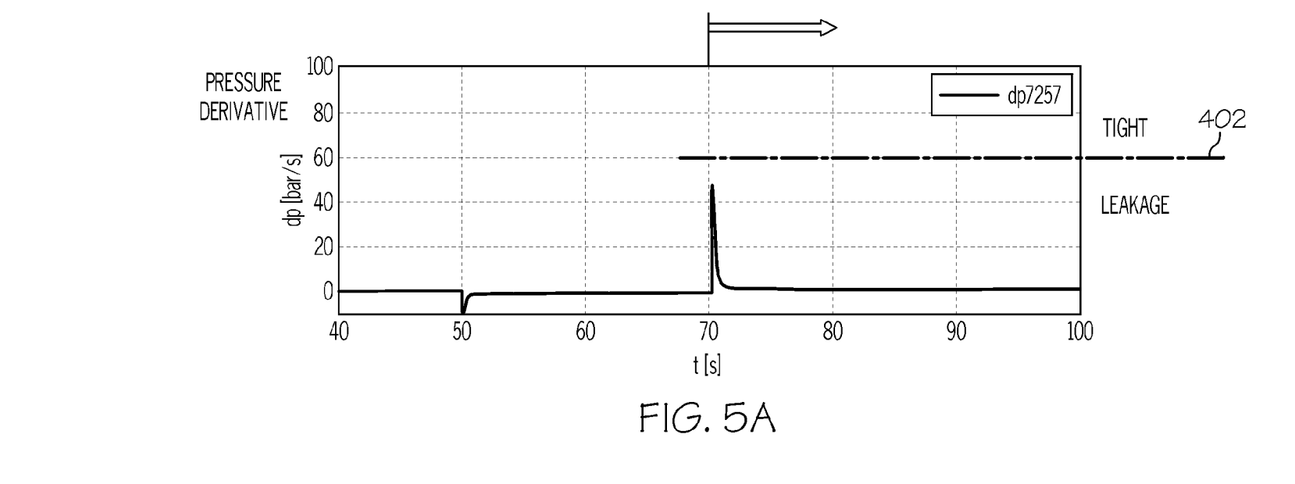
FIG. 5A is a plot of a pressure derivative as a function of time for a faulty tank valve, identified by an aspect of the present invention.
Figure 5B:
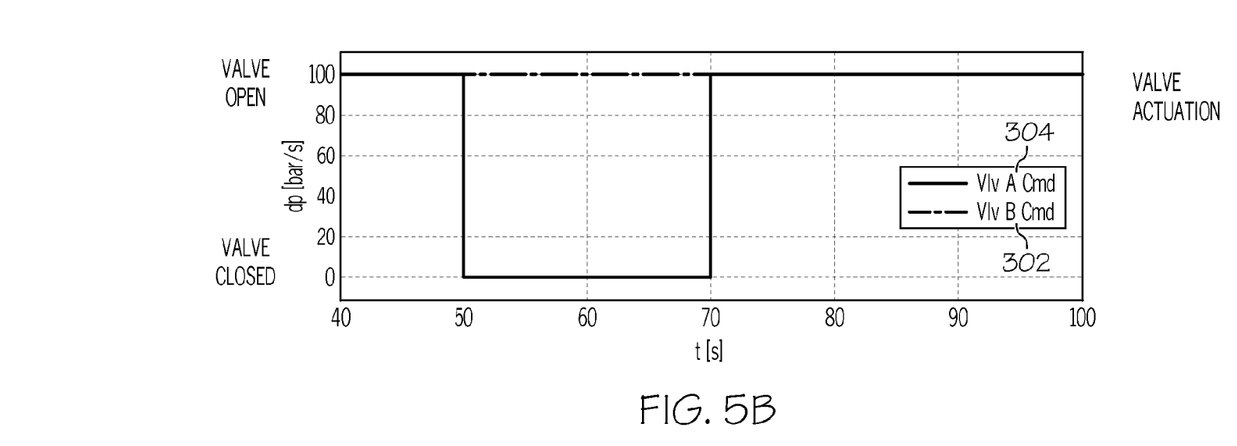
FIG. 5B is a plot of the position of tank valves as a function of time.

Referring now to FIG. 5A, a plot of the pressure derivative for a faulty valve 208 is shown, according to an exemplary embodiment. FIG. 5B shows the position of the tank valves as a function of time. As shown, a valve fault condition exists in valve 208 (e.g., valve 208 is leaking). When control signal 304 causes valve 208 to reopen, the pressure spike is muted, since some of the gas in vessel 204 was already being fed into the gaseous fuel system of vehicle 100 from the leak.

Similar to the plot in FIG. 4A, the spike in the pressure derivative shown in FIG. 5A may be compared against threshold value 402 to diagnose the leak in valve 208. Here, the pressure derivative is below threshold value 402, indicating a lower than expected pressure derivative. Detection of such an event can be used as part of a diagnostic system to detect the fault in valve 208 and to generate one or more alerts to warn the driver, passengers, and other people associated with vehicle 100 that a fault in the gaseous fuel system has been detected.

Figure 6:
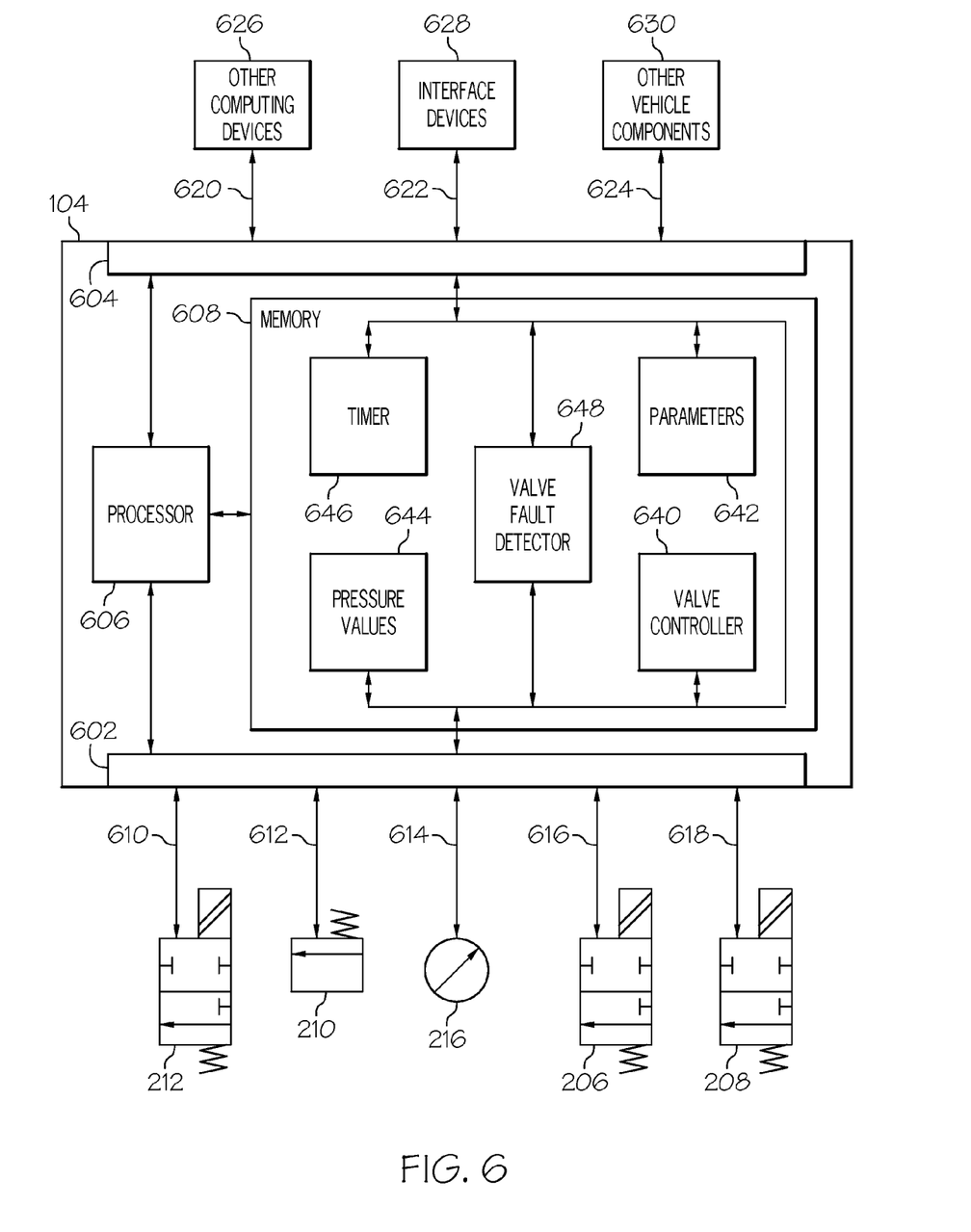
FIG. 6 is a schematic illustration of a controller for the vehicle shown in FIG. 1, according to an aspect of the present invention.

Referring now to FIG. 6, a detailed schematic illustration of a controller is shown, according to an exemplary embodiment. Controller 104 provides control and monitoring over some or all of the gaseous fuel system of vehicle 100. As shown, controller 100 provides control over tank valves 206, 208, master valve 212, and pressure regulators 210, to provide gaseous fuel stored in vessels 202, 204 for use by vehicle 100. Controller 104 also receives pressure data from pressure sensor 216 and uses the pressure data to control the fuel system and to diagnose valve failure conditions.

Bus lines 610, 612, 614, 616, and 618 connect master valve 212, pressure regulators 210, pressure sensor 216, and tank valves 206, 208 to controller 104 via interface 602, respectively. Bus lines 610, 612, 614, 616, and 618 may be any combination of hardwired or wireless connections. For example, bus line 614 may be a hardwired connection to provide pressure readings to controller 104, while bus line 610 may be a wireless connection to provide control signals to master valve 212. In some embodiments, bus lines 610, 612, 614, 616, and 618 are part of a shared data line that convey control signals to the components and pressure measurements to controller 104. In yet other embodiments, bus lines 610, 612, 614, 616, and 618 may include one or more intermediary circuits (e.g., other microcontrollers, signal filters, or the like) and provide an indirect connection between the sensors, components, and controller 104.

Interface 602 is configured to receive the sensor data from pressure sensor 216 via bus line 614 and to provide control signals via bus lines 610, 612, 616, and 618. For example, interface 602 may include one or more wireless receivers, if any of bus lines 610, 612, 614, 616, and 618 are wireless connections. Interface 602 may also include one or more wired ports, if any of bus lines 610, 612, 614, 616, and 618 are wired connections. Interface 602 may also include circuitry configured to digitally sample or filter the pressure sensor data from pressure sensor 216. For example, interface 602 may sample the pressure data received from pressure sensor 216 via bus line 614 at discrete times (e.g., k, k+1, k+2, etc.) to produce discrete voltage values (e.g., P(k), P(k+1), P(k+2), etc.).

Controller 104 may also communicate with other computing devices 626, interface devices 628, and other vehicle components 630 via interface 604 and bus lines 620, 622, and 624, respectively. Other computing devices may include other controllers in vehicle 100, a remote computer that sends and receives data to and from vehicle 100, or any other form of computing device. For example, other computing devices 626 may include a remote server that monitors the performance of vehicle 100, in order to provide road-side assistance. Interface devices 628 may include display devices, audio devices (e.g., a speaker), and input devices that allow a user to view and/or provide data to controller 104. Other vehicle components 630 may include any other vehicle component also controlled by controller 104 or provides data to controller 104. For example, other vehicle components 630 may include other sensors that provide data such as temperature, voltage, current, pressure, air flow, or any other form of data used by controller 104.

Similar to interface 602, interface 604 may provide one or more wired or wireless connections via bus lines 620, 622, and 624. For example, controller 104 may communicate status condition information to an external server in other computing devices 626 via a cellular, WiFi, or satellite connection. Interface 604 may also include one or more receivers configured to send and receive location information for vehicle 100 to other computing devices 626. For example, interface 604 may include a GPS receiver or cellular receiver that utilizes triangulation to determine the location of vehicle 100. In other embodiments, interfaces 602 and 604 may be a combined interface that handles some or all of the communication to and from controller 104.

Controller 104 also includes memory 608, which may be any form of non-transitory memory capable of storing machine-executable instructions that implement one or more of the functions disclosed herein, when executed by processor 606. For example, memory 608 may be a ROM, flash memory, CD-ROM, DVD-ROM, hard drive, EEPROM, or any other suitable memory device for storing the instructions. In some embodiments, memory 608 may include any number of memory devices that communicate with processor 606. Similarly, processor 606 may be one or more processors that read the machine instructions from memory 608 and implement the functions of controller 104. In some embodiments, the one or more processors and memory devices are part of a distributed computing system that perform the functions of controller 104. For example, processor 606 may include a processor located within vehicle 100 that receives pressure measurements from pressure sensor 216 and a processor located remotely from vehicle 100 that utilizes the pressure measurements to determine if a valve fault condition exists.

Memory 608 includes valve controller 640, which provides control over tank valves 206, 208, master valve 212, and pressure regulators 210 (e.g., by causing one or more control signals to be sent via interface 602). It is to be understood that tank valves 206, 208, and/or master valve 212 may be active-high or active-low, according to various embodiments. In either case, a valve open command may be any command that causes a valve to open and a valve close command may be any command that causes a valve to close. For example, if the particular valve being controlled is active-high, a valve open command may cause controller 104 to provide a voltage via interface 602 to the valve, in order to open the valve. Similarly, if the controlled valve is active-high, a valve close command may cause controller 104 to provide either no voltage to the valve or a lower voltage via interface 602 than that caused by the valve open command, in order to close the valve.

During a system full-run, valve controller 640 opens tank valves 206, 208 to provide the gaseous fuel to the fuel system of vehicle 100. Valve controller 640 also controls master valve 212 to provide the fuel for use as propulsion energy. For example, master valve 212 may control the flow of hydrogen from fuel storage 102 to one or more fuel cells, to be used to generate electrical energy. In some embodiments, valve controller 640 may also control pressure regulators 210 if any of the regulators are electronically control, in order to regulate the amount of pressure within the fuel system.

Memory 608 also stores pressure values 644 received from pressure sensor 216 via interface 602. Pressure values 644 may be used as part of the control over the gaseous fuel system and/or to diagnose valve fault conditions. For example, valve controller 640 may close one or all of valves 206, 208, and 212, if pressure values 644 indicate a higher than expected pressure in the fuel system.

Timer 646 stores timing information that may be associated with pressure values 644. The timing information may be generated by either hardware (e.g., a crystal oscillator in processor 606, a timing circuit, or the like) or received via software (e.g., as remote timing data received from other computing devices 626). The timing information may further be used by valve controller 640 to regulate the flow of gaseous fuel. For example, valve controller 640 may use the timing information to open or close valves 206, 208, and 212 at specific times.

Parameters 642 includes one or more configuration values for use by controller 104. The configuration values may be preset by the manufacturer of controller 104 or vehicle 100, set by a user utilizing interface devices 628, and/or set by other computing devices 626. For example, a mechanic utilizing interface devices 628 may adjust the configuration of controller 104, if a fault condition is suspected. In another example, if a hazardous condition is detected, other computing devices 626 may send a vehicle shutdown command to parameters 646. In yet another example, parameters 642 may include a value that controls how long a particular tank valve is closed during a diagnostic routine. This value may be adjusted to accommodate different fuel system designs, based on the number of storage vessels used in the vehicle.

Valve fault detector 648 detects valve fault conditions in tank valves 206, 208 by causing a diagnostic routine to be performed on the gaseous fuel system during a full run. During the diagnostic routine, valve fault detector 648 causes valve controller 640 to close and reopen either tank valve 206 or 208, while keeping the other valve open. Pressure values 644 received from pressure sensor 216 are associated with timing information from timer 646. In one embodiment, valve fault detector 648 determines the derivative of the pressure values 644 as a function of time and compares the derivative at the time the tested valve is reopened to a threshold parameter stored in parameters 642. If the determined pressure derivative is lower than the threshold parameter, a valve fault condition may exist. In another embodiment, valve fault detector 648 compares pressure values 644 directly to expected pressure values stored in parameters 642 that correspond to no leakage in a valve. Valve fault detector 648 may provide an indication of the results of the diagnostic routine to other computing devices 626 and/or to interface devices 628 (e.g., as indicia on a display, as an audio alert, or the like). If valve fault detector 648 detects a potential valve fault, it may also initiate corrective measures, in some embodiments. For example, valve fault detector 648 may provide an indication of the detected fault to valve controller 640, which may close master valve 212.

Many modifications and variations of embodiments of the present invention are possible in light of the above description. The above-described embodiments of the various systems and methods may be used alone or in any combination thereof without departing from the scope of the invention. For example, although a specific number of fuel vessels are shown, it is to be appreciated that combination of two or more vessels are also contemplated. Although the description and figures may show a specific ordering of steps, it is to be understood that different orderings of the steps are also contemplated in the present disclosure. Likewise, one or more steps may be performed concurrently or partially concurrently. Where one or more functions are performed by a processor in communication with a memory, it is also contemplated that any number of processors and/or memories may be used.

What is claimed is:

1. A method for detecting a tank valve leak in a fuel cell-powered vehicle storing anode reactant as part of a gaseous fuel system, the fuel system including a plurality of connected vessels having tank valves regulating the flow of anode reactant therefrom, the method comprising:
    utilizing a processor to send a valve close command to a tank valve at a first time, when the remaining tank valves in the plurality are open such that the anode reactant being delivered from at least one of the connected vessels to at least one anode in a fuel cell stack remains uninterrupted even during the closure of the tank valve;
    utilizing the processor to send a valve open command to the tank valve at a second time;

receiving, at the processor, pressure data measured from the gaseous fuel system;

using the pressure data and the processor to determine a derivative pressure differential signal representative of the rate of change in the pressure of the anode reactant being delivered from the gaseous fuel system as a function of time; and using the pressure differential signal to determine if a valve leak condition exists by comparing the pressure differential signal to a threshold parameter.

2. The method of claim 1, further comprising:
providing an indication of the detected valve leak condition to an interface device.

3. The method of claim 1, wherein the tank valve is a solenoid valve.

4. The method of claim 1, wherein the anode reactant comprises hydrogen gas.

5. The method of claim 1, further comprising detecting the valve leak condition during periods of operation not associated with the startup or shutdown of the fuel system.

6. The method of claim 1, further comprising:
providing an indication of the detected valve leak condition to a computer device external to the vehicle.

7. A controller to diagnose a tank valve leak in a fuel cell-powered vehicle storing anode reactant in a gaseous fuel system, the fuel system including a plurality of connected vessels having tank valves regulating the flow of anode reactant therefrom, the controller comprising:
one or more processors; and
a non-transitory memory coupled to the one or more processors and storing instructions that, when executed by the processor, cause the one or more processors to:
send a valve close command to a tank valve at a first time and a valve open command to the tank valve at a second time, when the remaining tank valves in the plurality are open to receive the anode reactant being delivered from at least one of the connected vessels to at least one anode in a fuel cell stack through the open tank valves in a substantially uninterrupted manner;
receive pressure data from a pressure sensor that measures the pressure of the fuel system;
use the pressure data to determine a derivative pressure differential signal representative of the rate of change in the pressure of the anode reactant being delivered from the fuel system as a function of time; and
using the pressure differential signal to determine if a valve leak condition exists by comparing the pressure differential signal to a threshold parameter stored in the memory.

8. The controller of claim 7, wherein the instructions further cause the one or more processors to provide an indication of the detected valve leak condition to an interface device.

9. The controller of claim 8, wherein the interface device is a display device.

10. The controller of claim 7, wherein the tank valve is a solenoid valve.

11. The controller of claim 7, wherein the instructions further cause the one or more processors to receive an updated threshold parameter from an interface device and to store the updated threshold parameter in the memory.

12. The controller of claim 7, wherein the instructions further cause the one or more processors to control the flow of anode reactant to the fuel cell, and wherein the valve open and valve close commands are sent while the anode reactant is provided to the fuel cell.

13. The controller of claim 7, wherein the instructions further cause the one or more processors to provide an indication of the detected valve leak condition to a computer device external to the vehicle.

14. A propulsion system for a fuel cell-powered vehicle comprising:
a fuel cell stack;
two or more anode reactant storage vessels in selective fluid communication with the fuel cell stack;
at least one valve coupled to each vessel that regulates the flow of the anode reactant from each vessel to at least one anode in the fuel cell stack, wherein the valves are connected by a common fuel line;
a pressure sensor that measures the pressure in the common fuel line; and
a controller that closes the at least one valve of a vessel while the valves of the other vessels are open to receive anode reactant from the other vessels through the open tank valves in a substantially uninterrupted manner, reopens the at least one valve, receives pressure measurements from the pressure sensor, determines a derivative pressure differential signal representative of the rate of change of the pressure over time from when the valve is reopened, and determine if a valve leak condition exists for the at least one valve by using the pressure differential signal to compare the pressure differential signal to a threshold parameter.

15. The system of claim 14, wherein the anode reactant comprises hydrogen gas.

16. The system of claim 14, wherein the at least one valve is a solenoid valve.

17. The system of claim 14, further comprising at least one of a display or a speaker, and wherein the controller provides an indication of the determined valve leak condition to the at least one of a display or a speaker.

18. The system of claim 14, further comprising a master valve that regulates the flow of the anode reactant to a fuel cell, and wherein the controller closes the master valve if a valve leak condition is determined to exist.

19. The system of claim 14, wherein the controller provides an indication that a valve leak condition exists to a computing device located remotely from the vehicle.

* * * * *